2,916,465

HYDROCARBON SOLUBLE CONVERSION PRODUCTS OF ISOMERIZED RUBBER AND STYRENE AND THEIR PRODUCTION

Johannes Reese, Wiesbaden-Biebrich, Germany

No Drawing. Application October 9, 1956
Serial No. 614,809

10 Claims. (Cl. 260—4)

This invention relates to hydrocarbon soluble copolymers of isomerized rubber and styrene having high styrene content and their production.

It is known that solutions of isomerized rubber in styrene can be reacted in the presence of benzoyl peroxide. However, these conversion products have considerable practical deficiencies. More specifically, they do not give products which are clearly soluble in certain desirable petroleum hydrocarbons if more than 15–20% of styrene relative to the amount of isomerized rubber is used in the polymerization process. This is a serious disadvantage since the isomerized rubber-styrene copolymers find their greatest use in paints and like protective coating media where the sole use of inexpensive petroleum hydrocarbons is of great advantage.

It has now been found that copolymers of isomerized rubber and styrene containing substantially larger quantities of styrene can be produced which will form clear solutions in aliphatic hydrocarbons provided during the polymerization other polymerizable vinyl compounds are caused to react with the isomerized rubber. It has been found further that styrene may be replaced partly or wholly by another styrene namely, methyl styrene.

The vinyl compound other than a styrene may be used in a quantity substantially less than the quantity of the styrene. Esters of $\alpha,\beta$-unsaturated carboxylic which can themselves polymerize or copolymerize have proven especially valuable. Such esters include esters of acrylic acid, methacrylic acid, maleic acid, fumaric acid and the like. The esters of such acids derived from monohydric alcohols having at least 3 carbon atoms, especially those derived from butanol, are preferred. Vinyl esters of higher molecular weight fatty acids, vinyl esters of resinic acids and vinyl esters of low molecular weight carboxylic acids, such as vinyl acetate, may also be used in the process of the invention.

At times it may be advantageous to use more than one polymerizable vinyl compound other than a styrene. In order to obtain a product which is clearly soluble in the desired petroleum or aliphatic hydrocarbons it is usually sufficient to use 3–50% of the vinyl compound other than the styrene in comparison to the amount of the styrene used.

The polymerization of this invention is most advantageously carried out in a solvent. It is most advantageous to carry out the polymerization in a petroleum hydrocarbon but aromatic hydrocarbons boiling above 150° C. can be used also. In order not to obtain too highly viscous solutions, it is desirable to add simultaneously with the monomers the quantity of solvent desired in the final product. Polymerization temperatures are characteristically above 130° C. but not above 200° C. Temperatures between 150–170° C. have proven particularly advantageous. A control of polymerization temperatures within this range is most advantageously obtained by using a petroleum hydrocarbon boiling in this range such as so-called mineral spirits.

Generally speaking, organic peroxides or hydroperoxides can be used as catalysts. Peroxides having a decomposition temperature near the used polymerization temperature and which dissolve in the solvent at such a temperature are preferred. In this respect di-tert.-butyl peroxide behaves very favorably. By using a catalyst which is comparatively stable at normal temperatures, premature polymerization below desired polymerization temperatures is avoided. The amount of catalyst used should be kept within desired limits. Sufficient catalyst should be used to complete the conversion but too much might cause an undesirable increase in viscosity or may even cause the entire charge to gelatinize. Usually, 1–2% peroxide, based upon the amount vinyl compound copolymerized into the isomerized rubber, is sufficient.

The viscosity of the polymerization products can be regulated further by the addition of substances which are also effective as antioxidants such as, for instance, 2,6-di-tert.-butyl-p-cresol and similar phenols. These substances have no damaging influence on the conversion or copolymerization. Through tests, the most suitable ratio of catalyst and antioxidants can easily be determined. When using lacquers, it is frequently desirable not to have solutions which are too highly viscous in order to provide lacquers with a good body. Such viscosity controls can be effected by the addition of an antioxidant.

The conversion products or copolymers produced in accordance with this invention are characterized in the lacquer industry as quick drying. They give hard but generally somewhat brittle coating so that they are not customarily used alone. Through the use of softeners, or plasticizers, it is possible to produce films which are sufficiently elastic. Suitable softeners or plasticizers are the same as used for the plasticizing of isomerized rubber. For example, chlorinated aliphatic or aromatic hydrocarbons, fatty oils, alkyd resins and the like may be used. If especially alkali resistant combinations are desired, esters of methacrylic acid will be used in the polymerization and unsaponifiable plasticizers will be used in the lacquer coating. If no such high demands are placed on the alkali fastness of the coatings any other combination already mentioned may be used.

The cyclic or isomerized rubbers used in the process hereof should not be too highly viscous. Those products which are cyclized in the presence of phenol and acid catalyst, with or without a solvent, at high temperatures have proven very satisfactory.

The following examples will further illustrate the invention but are not to be considered a limitation thereupon. In the examples, and elsewhere herein, the parts are expressed as parts by weight.

*Example 1.*—A solution of 45 parts of vinyl toluol, 5 parts of the butyl ester of maleic acid, 1 part of di-tert.-butyl peroxide in 55 parts of mineral spirits is dripped slowly into 100 parts of a 55% solution of isomerized rubber in mineral spirits heated to 160° C. Subsequently heating is continued for another 4 hours at the same temperature. There is no limit to the conversion product being soluble in the mineral spirits. The viscosity of the solvent-free resin in the mineral spirits 1:3 at 20° C. amounts to 59.5 cp. The isomerized rubber used as raw material has a viscosity of 35 cp. under the same conditions. The vinyl toluol is converted to the extent of 90.1%, the maleic acid dibutyl ester to the extent of 90.3%. The conversion of the monomers is determined by distilling in vacuum a weighted quantity of resin solution and by determining the vinyl toluol in the distillate by means of Hg-acetate in methanol according to R. W. Martin, Analytical Chemistry 21, 921 (1949)

and the butyl ester on the basis of the saponification number of the distillate.

Example 2.—A solution of 55 parts of isomerized rubber in 45 weight parts of mineral spirits is heated to boiling and, under stirring, a mixture of 20 parts of styrol, 30 parts of vinyl toluol, 6 parts of methacrylic acid butyl ester, 1 part of di-tert.-butyl peroxide and 55 parts of mineral spirits are dripped slowly into the solution. Then boiling is continued for another 5 hours. At this time, about 95% of the styrol/vinyl toluol mixture and 100% of the methacrylic acid butyl ester have been converted. The viscosity of the clear mixed polymerizate in mineral spirits 1:3 at 20° C. is 134 cp. If heating is continued for only 1 hour after addition of the monomer solution 100% of the methacrylic acid butyl ester and more than 90% of the styrol/vinyl toluol mixture are converted. The resin obtained is likewise clear and soluble in the mineral spirits. It has a viscosity of 87 cp. at 20° C. when dissolved 1:3 in mineral spirits.

If the vinyl toluol is left out and in its stead 50 parts of styrol are added a resin is obtained which under otherwise the same conditions is turbid and does not dissolve clear in the mineral spirits. In this case the quantity of the methacrylic acid butyl ester must be increased. When using vinyl toluol, on the other hand, a smaller addition of butyl ester is sufficient in order to obtain clear polymerizate solutions.

Example 3.—A mixture of 42 parts of vinyl toluol, 18 parts of vinyl acetate, 1 part of di-tert.-butyl peroxide and 60 parts of mineral spirits are slowly dripped into 100 parts of a 60% mineral spirits solution of isomerized rubber heated to 160° C. During the addition a substantial decrease in temperature takes place. After further heating for 4 hours, during which the temperature again rises to 160° C., a very highly viscous resin solution is obtained. The viscosity of the resin in the mineral spirits 1:3 at 20° C. amounts to 301 cp. The resin is characterized by a very good compatibility with fatty oils and alkyd resins.

Example 4.—In the course of 2 hours a mixture of 50 parts of vinyl toluol, 5 parts of methacrylic acid butyl ester, 1 part of di-tert.-butyl-peroxide, 1 part of 2,6-di-tert.-butyl-p-cresol and 55 parts of mineral spirits are added to 100 parts of a 55% mineral spirit solution of isomerized rubber heated to 160° C. Subsequently after heating for another 4 hours, the conversion product is excellently soluble in the mineral spirits, it has a viscosity therein of 44.7 cp. (1:3 at 20° C.). The vinyl toluol is converted to the extent of 95.6%, the methacrylic acid butyl ester to the extent of 98.6%.

It should be understood that the present invention is not limited to the exact conditions and procedures described above but that it extends to all equivalents which would occur to those skilled in the art upon consideration of this disclosure and the claims appended hereto.

What is claimed is:

1. A copolymer forming clear solutions in mineral spirits comprising a copolymer of isomerized rubber, a monovinyl benzene selected from the group consisting of styrene and a methyl styrene in a quantity at least 70 percent of the quantity of said isomerized rubber, and a quantity of butyl methacrylate between about 3 and 50% of the quantity of said monovinyl benzene.

2. A process for the production of copolymerizates of isomerized rubber and copolymerizable monomer compositions forming clear solutions in mineral spirits, which comprises heating and copolymerizing in mineral spirits and in the presence of a peroxide catalyst at temperatures between about 150 and 200° C. (a) isomerized rubber with (b) a mixture of (1) a monovinyl benzene selected from the group consisting of styrene and a methyl styrene in a quantity at least equal to 70 percent of the quantity of said isomerized rubber and (2) a polymerizable alkyl ester of an α,β-unsaturated aliphatic carboxylic acid in a quantity between about 3% to 50% of the quantity of said benzene.

3. A process for the production of copolymerizates of isomerized rubber and copolymerizable monomer compositions forming clear solutions in mineral spirits, which comprises dissolving isomerized rubber in mineral spirts, adding to said solution (1) a monovinyl benzene selected from the group consisting of styrene and a methyl styrene in a quantity at least equal to 70 percent of the quantity of said isomerized rubber and (2) a polymerizable alkyl ester of an α,β-unsaturated aliphatic carboxylic acid in a quantity between about 3% to 50% of the quantity of said styrene, and heating the resulting mass in the presence of a peroxide catalyst at a temperature between about 150 and 200° C. to copolymerize the isomerized rubber with the added styrene and the added ester of the α,β-unsaturated aliphatic carboxylic acid.

4. A copolymer forming clear solutions in mineral spirits comprising, the copolymer of (a) isomerized rubber with (b) a mixture of (1) a monovinyl benzene selected from the group consisting of styrene and a methyl styrene in a quantity at least equal to 70 percent of the quantity of said isomerized rubber and (2) a polymerizable alkyl ester of an α,β-unsaturated aliphatic carboxylic acid in a quantity between about 3% to 50% of the quantity of said benzene.

5. A copolymer forming clear solutions in mineral spirits comprising, the copolymer of (a) isomerized rubber with (b) a mixture of (1) a monovinyl benzene selected from the group consisting of styrene and a methyl styrene in a quantity at least equal to 70 percent of the quantity of said isomerized rubber and (2) a polymerizable alkyl ester of an α,β-unsaturated monobasic aliphatic carboxylic acid in a quantity between about 3% to 50% of the quantity of said benzene.

6. A copolymer forming clear solutions in mineral spirits comprising, the copolymer of (a) isomerized rubber with (b) a mixture of (1) a monovinyl benzene selected from the group consisting of styrene and a methyl styrene in a quantity at least equal to 70 percent of the quantity of said isomerized rubber and (2) alkyl ester of maleic acid in a quantity between about 3 and 50 percent of the quantity of said benzene.

7. A copolymer forming clear solutions in mineral spirits comprising, the copolymer of (a) isomerized rubber with (b) a mixture of (1) a monovinyl benzene selected from the group consisting of styrene and a methyl styrene in a quantity at least equal to 70 percent of the quantity of said isomerized rubber and (2) alkyl ester of methacrylic acid in a quantity between about 3 and 50 percent of the quantity of said benzene.

8. A copolymer forming clear solutions in mineral spirits comprising, the copolymer of (a) isomerized rubber with (b) a mixture of (1) methyl styrene in a quantity at least equal to 70 percent of the quantity of said isomerized rubber and (2) a polymerizable alkyl ester of an α,β-unsaturated aliphatic carboxylic acid in a quantity between about 3% to 50% of the quantity of said styrene.

9. A clear liquid composition adapted for use as the base for protective and decorative coatings comprising, a mineral spirit solution of a copolymer of (a) isomerized rubber with (b) a mixture of (1) a monovinyl benzene selected from the group consisting of styrene and a methyl styrene in a quantity at least equal to 70 percent of the quantity of said isomerized rubber and (2) a polymerizable alkyl ester of an α,β-unsaturated aliphatic carboxylic acid in a quantity between about 3% to 50% of the quantity of said benzene.

10. A copolymer forming clear solutions in mineral spirits comprising a copolymer of isomerized rubber, a quantity of methyl styrene at least equaling 70 percent of the quantity of said isomerized rubber, and a quantity of butyl ester of maleic acid between about 3 and 50% of the quantity of said styrene.

References Cited in the file of this patent

UNITED STATES PATENTS

| 2,364,089 | Mitchell | Dec. 5, 1944 |
| 2,407,143 | Daur et al. | Sept. 3, 1946 |
| 2,422,550 | Jacobson | June 17, 1947 |

FOREIGN PATENTS

| 702,606 | Great Britain | Jan. 20, 1954 |
| 712,039 | Great Britain | July 14, 1954 |

OTHER REFERENCES

Ser. No. 437,596, Le Bras et al. (A.P.C.), published April 20, 1943, now abandoned.